Dec. 21, 1954

R. C. INGRAHAM 2,697,268

DIODE FABRICATING APPARATUS

Filed Dec. 30, 1950

INVENTOR
ROBERT C. INGRAHAM
BY Paul S. Martin
ATTORNEY 2,697,268

DIODE FABRICATING APPARATUS

Robert C. Ingraham, Boston, Mass., assignor to Sylvania Electric Products Inc., a corporation of Massachusetts Application December 30, 1950, Serial No. 203,611

1 Claim. (Cl. 29—25.1)

The present invention relates to methods and apparatus for assembling point-contact rectifiers and like devices such, for example, as germanium diodes.

In the manufacture of germanium diodes (to which the illustrative disclosure below is particularly directed) a resilient wire or "whisker" having a pointed end is attached to a metal fitting and is later assembled in pressure contact with a semi-conductor element or "crystal" similarly supported on a metal fitting. The whisker with its fitting and the semi-conductor with its fitting are inserted into the ends of a protecting and electrically insulating tube. It is important that the whisker engage the semi-conductor surface as nearly as possible with a perpendicular line of thrust. The semi-conductor normally is made as small as practicable because of its high cost. Accordingly, it is desirable that the point of the whisker should be accurately located, for surely engaging the semi-conductor with consistent accuracy when assembled. One object of the present invention is to provide a method and apparatus for assuring proper whisker adjustment. Being of tungsten or like highly resilient wire, this is no slight problem.

In assembling devices of this kind heretofore, a hole has been provided in the side of the insulating tube. This enabled adjustment of the whisker on the crystal manually, by means of tweezers in the virtually complete assembly. This hole was also used as an aperture for filling the space around the contact with wax or the like, and the hole then had to be covered.

The hole, though obviously a convenience, has proved costly because of the additional operations it entails, and accordingly an object of this invention is to provide a method of assembling crystal diodes in which the side hole and the hole-forming and hole-covering operation are eliminated.

In a previous attempt to eliminate the hole, the formed whiskers were inspected, deformed whiskers were adjusted and again inspected, and whisker units having reasonably centered points were finally assembled in contact with a crystal. A further object of this invention is to eliminate the need for individual attention and the hit-or-miss character of this whisker adjustment.

Further aspects of this invention are related to the completion of the diode assembly in such a way as to protect the whisker after its accurate adjustment and to fill the space about the contact with a fluid affording protection against atmospheric attack, despite the omission of a side hole in the insulating tube.

The nature of the invention and its further features of novelty will be apparent from the following detailed disclosure of the illustrative embodiment. In the accompanying drawing.

Figure 1:
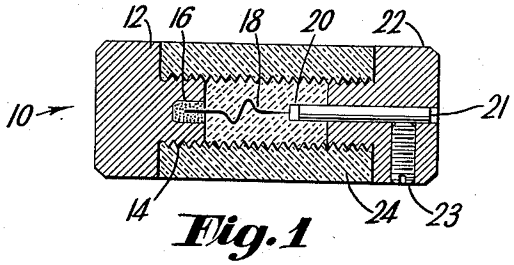
Figure 1 is an enlarged longitudinal cross-sectional view of a completed diode unit.

In Figure 1, a whisker unit 10 is shown having a metal fitting 12 as of brass, threaded at 14, and provided with a cup 16 at which a whisker 18 is secured by soldering. Whisker 18 of .005 inch diameter tungsten and having a conically ground point is shown aligned with the axis of fitting 12, and it is shown in proper engagement with "crystal" or semi-conductor element 20 soldered to pin 21 and locked to fitting 22 by a set-screw 23. The space about crystal 20 and the whisker is filled with a semi-fluid wax.

Fittings 12 and 22 are screwed into the ends of a ceramic tube 24. The ceramic tube, the crystal unit and whisker fitting 12 are all susceptible to accurate construction, and all that remains for consistent, reliable engagement of whisker 18 with crystal 20 is that the whisker should be accurately directed along the common axis of its fitting 12, of fitting 22, and of ceramic tube 24.

In the assembled unit, the whisker was previously adjusted by means of tweezers in each diode separately and despite the resilience of the contact, the point was retained in position by virtue of a crater formed in the process of an electrical pulsing treatment primarily used to improve performance. The present method and apparatus afford reliable centering of the whisker point despite the extreme resilience of the whisker, and remove the hit-or-miss character and much of the individual attention involved in previous diode fabricating procedures.

Figure 2:
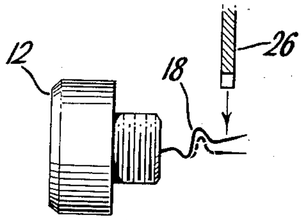
Figures 2 and 3 are enlarged views of successive phases of the adjustment of the whisker on a whisker unit forming part of the diode.

Referring now to Figure 2, a whisker unit with a metal fitting 12 is shown having its whisker 18 in an off-center position such as may result from inaccurate soldering or from deformation due to handling. The whisker is pointed at this stage, having been rotated about its axis in prolonged light contact with a rotating grinding wheel.

Figure 3:
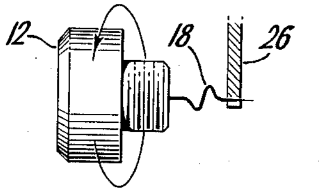

As shown in Figures 2 and 3, the present invention effects accurate centering adjustment consistently in a way to obviate inspection, by thrusting a blade 26 laterally against the whisker, and while holding the blade in this position, rotating the whisker through a number (not excessive) of revolutions. The whisker illustrated is greatly enlarged, being actually approximately ⅛ of an inch long and of 0.005 inch diameter tungsten. Allowing for the extreme resilience of the whisker, blade 60 is desirably adjusted so that the end of its stroke against the whisker will pass the axis of fitting 12 by approximately .05 inch. The correct position for blade 26 can be readily determined by adjusting a number of whisker units and checking each of them, after which the adjusted whisker units need not be inspected because they will uniformly be correctly adjusted with the whisker point along the center line of the metal fitting 12.

Figures 4, 5, 6:
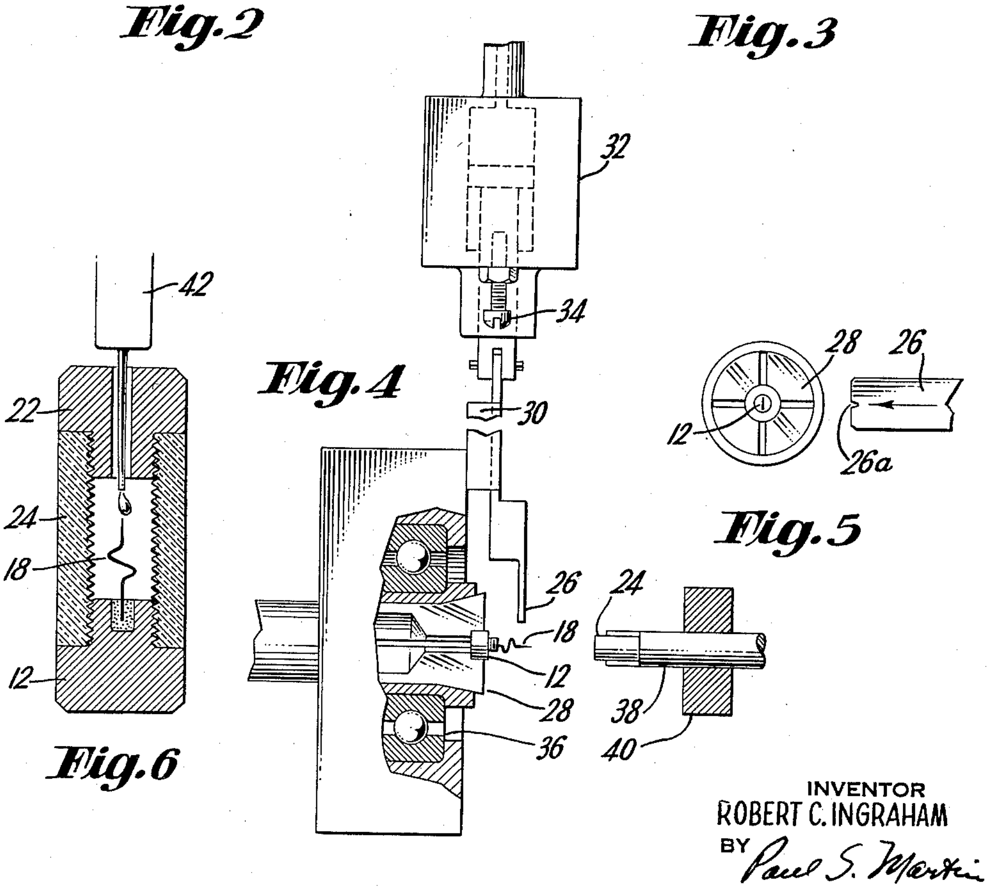
Figure 4 is a plan view of apparatus employed in adjusting the whisker, portions thereof being shown in section for clarity.
Figure 5 is a fragmentary end view of part of the apparatus in Figure 4.
Figure 6 is a fragmentary view of the operation of supplying a semi-fluid filling.

Illustrative apparatus in which this method is mechanically effected is shown in Figures 4 and 5. Details of suitable apparatus for this purpose are disclosed in a copending application Number 203,585, now abandoned, filed concurrently herewith on December 30, 1950, by Herman Nowak, entitled "Diode Assembling Apparatus." In Figure 4 a collet 28 is shown which grips each manually inserted fitting 12 so that the whisker extends to a free position to be engaged by blade 26. This blade is reciprocably operated in slide 30 by an air actuator 32, the forward stroke of this blade being limited by an adjustable stop 34. Collet 28 is rapidly rotatable in bearing 36 by means of a motor not shown, it being necessary to apply blade 26 to whisker 18 for only a brief period of time. The directness and effectiveness of this whisker adjusting method and apparatus make it possible to eliminate the routine inspection procedure of checking the centering.

The "straightened" or centered whisker is next protected against accidental deformation, in another aspect of the invention, by applying the insulating tube or "ceramic" as it is known in this form of diode while the whisker unit is still held in the rotary chuck. The rotation is of advantage in requiring only that the ceramic be pressed endwise against the threaded portion 14 of the whisker unit. This can be effected manually or, for more accurate alignment of the ceramic with the whisker fitting, it can be effected directly by thrusting the ceramic 24 endwise on a reciprocable carrier 38 in slide bearing 40 toward whisker unit 12. During rotation of the whisker unit, the ceramic is held frictionally by the carrier and is thus screwed into its position protecting the whisker.

An adjusted whisker, exposed to handling hazard, would to a large extent sacrifice the advantages realized through elimination of the access hole in the ceramic. This same advance also creates the problem of filling the space about the crystal with the material guarding the contact against atmospheric attack. This problem is solved by filling the ceramic with the fluid after the whisker has closed one end of the ceramic through the open end that at this stage has not received the crystal unit. The operation is shown in Figure 6.

Fitting 22 is screwed into the ceramic after the operations of Figure 4 are completed. An injection nozzle is inserted into the bore that is to receive the crystal and its pin, and a measured charge of semi-fluid waxy material is forced by nozzle 42 into the ceramic about the whisker, practically if not entirely filling the cavity. Thereafter the crystal and its supporting pin are pushed into place, the air or any excess fluid being pressed out in the process. Pulsing the unit electrically, in the case of germanium crystal units, completes the device.

The foregoing sequence of operations collectively reduces the complexity of the operations as compared to that which may be identified with the side hole type of ceramic. However, certain aspects of the invention will be recognized as having merit apart from the others, and the illustrative embodiment will be recognized as having a range of applications and as being susceptible to a latitude of modifications. Consequently the appended claim should be accorded a latitude of interpretation consistent with the spirit and scope of the invention.

What I claim is:

Apparatus for fabricating point-contact devices comprising a support, a chuck rotatably mounted on the support, said chuck having means for clamping a fitting carrying a projecting resilient whisker, a transfer member having means for supporting a tube for assembly with said fitting, a support for said transfer member, means for effecting axial sliding movement of the transfer member relative to the chuck to bring the tube into assembled relation on the fitting with the whisker projecting into the tube, a blade for adjusting the whisker prior to assembly of the tube, means for supporting the blade in predetermined relation to the chuck for lateral reciprocation across the center line of the chuck and means operative during rotation of the chuck to advance the blade into contact with the whisker and to deflect the whisker past the spin axis of the chuck and thereafter to retract the blade.

References Cited in the file of this patent

UNITED STATES PATENTS

| Number | Name | Date |
|---|---|---|
| 934,429 | Davies | Sept. 21, 1909 |
| 1,850,479 | Shelton | Mar. 22, 1932 |
| 2,367,672 | Di Cosmo et al. | Jan. 23, 1945 |
| 2,406,405 | Salisbury | Aug. 27, 1946 |
| 2,430,028 | Pfann et al. | Nov. 4, 1947 |
| 2,432,116 | McLean et al. | Dec. 9, 1947 |
| 2,438,893 | Bieling | Apr. 6, 1948 |
| 2,469,569 | Ohl | May 10, 1949 |
| 2,505,924 | Varga | May 2, 1950 |
| 2,603,692 | Schaff et al. | July 15, 1952 |
| 2,615,857 | Clarke | Oct. 28, 1952 |